United States Patent

Hayashi et al.

Patent Number: 5,653,583
Date of Patent: Aug. 5, 1997

[54] OIL HYDRAULIC PUMP

[75] Inventors: Tetsuji Hayashi, Gifuken; Masaharu Minowa, Gifu-ken, both of Japan

[73] Assignee: Kayaba Industry Co., Ltd., Tokyo, Japan

[21] Appl. No.: 594,833

[22] Filed: Jan. 31, 1996

[51] Int. Cl.⁶ .................................................. F16L 19/00
[52] U.S. Cl. ...................................... 417/313; 285/368
[58] Field of Search .................................. 285/211, 349, 285/368; 417/313

[56] References Cited

U.S. PATENT DOCUMENTS

| | | | |
|---|---|---|---|
| 2,632,659 | 3/1953 | Lee | 285/349 X |
| 2,817,543 | 12/1957 | Corsette | 285/349 X |
| 2,935,343 | 5/1960 | Ellis | 285/349 X |
| 3,545,794 | 12/1970 | Wise et al. | 285/349 X |
| 4,468,054 | 8/1984 | Orth | 285/211 X |
| 5,163,716 | 11/1992 | Bolton et al. | 285/211 X |

Primary Examiner—Richard E. Gluck
Attorney, Agent, or Firm—Steinberg, Raskin & Davidson, P.C.

[57] ABSTRACT

The invention provides an oil hydraulic pump wherein a suction connector can be attached readily to a body using a single bolt. Annular stepped portions direction reversely to each other are formed on a suction port of the body and a flange portion and an insertion projection of the suction connector, respectively, such that, when the insertion projection is inserted into the suction port, the annular stepped portions cooperate to form an annular seal groove. The annular seal groove has a pair of side faces opposing to each other in a direction perpendicular, and extending in parallel, to an axial line of the seal groove and serving as interference acting faces. The resilient force by the interference of the seal fitted in the seal groove acts only upon the interface acting faces. The outer diameter of the insertion projection of the suction connector is a little greater than the inner diameter of the suction port of the body so that, when the insertion projection is compulsorily inserted into the suction port, the suction connector is temporarily fastened to the suction port.

4 Claims, 3 Drawing Sheets

OIL HYDRAULIC PUMP

BACKGROUND OF THE INVENTION

1. Field of the Invention

This invention relates to an oil hydraulic pump which includes a suction connector provided at a suction port for sucking hydraulic operating fluid, and more particularly to a structure for attaching a suction connector to a suction port of an oil hydraulic pump.

2. Description of the Related Art

A typical one of convention oil hydraulic pumps is shown in FIGS. 4 and 5. Referring to FIGS. 4 and 5, the oil hydraulic pump shown includes a body b having a suction port 1 formed therein and having a seal groove 2 formed at a portion thereof around an opening of the suction port 1, and a seal 3 fitted in the seal groove 2.

A suction connector c is attached to the suction port 1. The suction connector c has a tubular portion 4 and has a flange portion 5 formed at an end of the tubular portion 4. A pair of bolt holes 6 are formed symmetrically at the opposite left and right end portions of the flange portion 5. Another pair of bolt holes 7 are formed in the body b in an aligned relationship with the bolt holes 6.

In order to attach the suction connector c to the body b, the seal 3 is fitted into the seal groove 2 first. Then, the suction connector c is placed so that the flange portion 5 thereof may be received by the seal 3, and a pair of bolts 8 are fitted into the bolt holes 6 and 7 to secure the suction connector c to the body b.

With the conventional pump described above, when to secure the suction connector c to the body b, the bolts 8 must be tightened with one hand while holding down the suction connector c with the other hand. Consequently, there is a problem that the attaching operation is unstable and the operation efficiency is very low.

Further, since a resilient force of a portion of the seal 3 corresponding to the interference acts in a direction to move the flange portion 5 away from the body b, each of the bolts 8 must be tightened with a sufficiently high tightening force to overcome the resilient force of the seal 3. Consequently, with the conventional pump described above, at least two bolts are required in order to obtain a balanced tightening force, and the number of bolts cannot be decreased any more.

SUMMARY OF THE INVENTION

It is an object of the present invention to provide an oil hydraulic pump wherein a suction connector can be attached readily to a body using a single bolt.

In order to attain the object described above, according to the present invention, there is provided an oil hydraulic pump, comprising a pump body having a suction port formed therein, a suction connector inserted in the suction port and fastened to the pump body by means of a bolt, the suction connector having thereon an insertion projection to be inserted into the suction port of the pump body and a flange portion, the pump body having an annular stepped portion formed along an opening edge of the suction port in an opposing relationship to the insertion projection and the flange portion of the suction connector. The annular stepped portion of the pump body and the flange portion and the insertion projection of the suction connector cooperate with each other, when the insertion projection is inserted in the suction port, to define an annular seal groove which has a pair of side faces extending in parallel to an axial line of the seal groove and serving as interference acting faces. The pump also includes a resilient seal fitted in the seal groove such that a resilient force by an interference thereof acts only upon the interface acting faces so that, when the insertion projection is compulsorily inserted into the suction port, the suction connector is temporarily fastened to the suction port.

In the oil hydraulic pump, even if the suction connector is temporarily fastened to the pump body with the seal fitted in the seal groove, since the resilient force of the seal corresponding to the interference does not act in a direction to move the suction connector away from the pump body, even if the suction connector is not kept held down, the suction connector keeps its temporarily fastened condition. Further, since the resilient force of the seal corresponding to the interference does not act in the direction to move the suction connector away from the body as described above, also the tightening force for the bolt for fastening the suction connector to the body may be comparatively weak. More particularly, the number of bolts for fastening the suction connector to the pump body can be minimized, for example, to one. Further, since the force to fasten the suction connector to the pump body may be comparatively weak, even if the suction connector is molded using a synthetic resin, it still can keep a sufficient strength. Where the suction connector is molded using a synthetic resin, it can be produced at a lower cost then where it is molded using a metal. Furthermore, since the suction connector can be temporarily fastened to the pump body, the operation efficiency upon assembly is improved remarkably.

Preferably, the suction connector has at least one bolt hole formed at the flange portion thereof while the pump body has a single bolt hole formed therein, and the pump body has a stopper provided thereon for engaging with the suction connector to establish alignment between the bolt holes. In this instance, if the suction connector is contacted with the stopper formed on the pump body with the suction connector temporarily fastened to the suction port, then the two bolt holes of the pump body and the suction connector are aligned with each other. Consequently, the efficiency in assembling operation is further improved, and also automatic assembly by a machine becomes possible.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
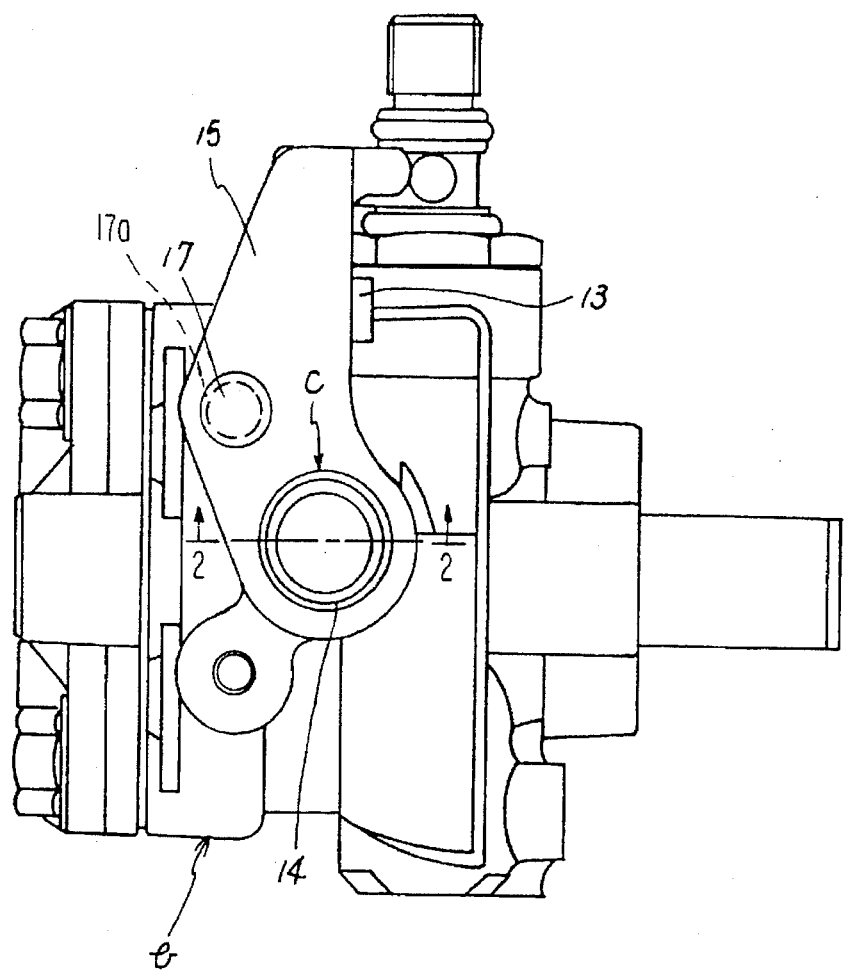
FIG. 1 is a top plan view of an oil hydraulic pump showing a preferred embodiment of the present invention.
Figure 2:
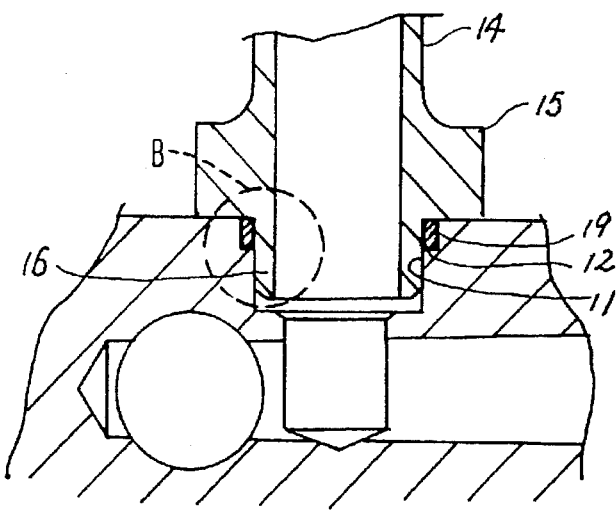
FIG. 2 is an enlarged partial sectional view of the oil hydraulic pump of FIG. 1.
Figure 3:
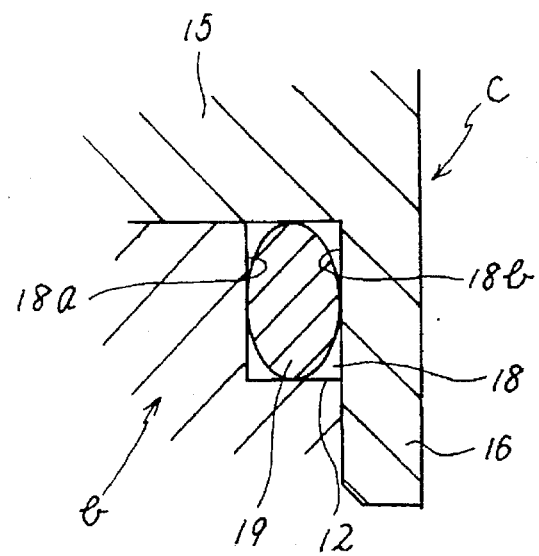
FIG. 3 is an enlarged view of the area B of FIG. 2.
Figure 4:
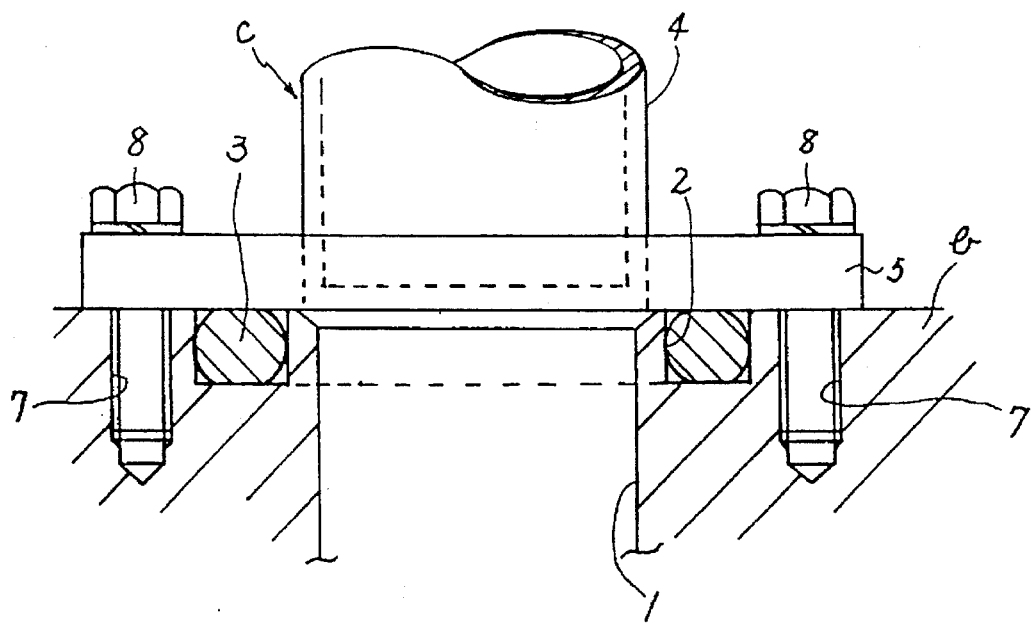
FIG. 4 is a partial sectional view of a conventional oil hydraulic pump.
Figure 5:
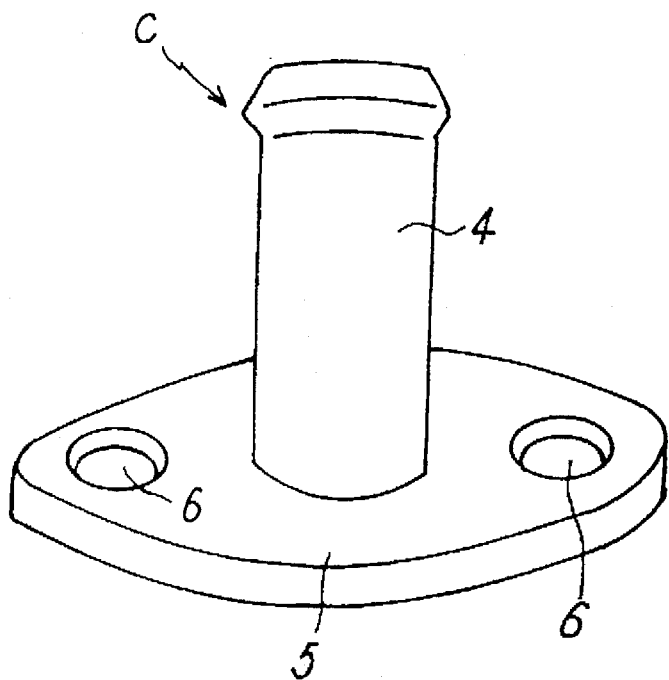
FIG. 5 is a perspective view of a suction connector for use with the oil hydraulic pump of FIG. 4.

Referring to FIGS. 1 to 3, there is shown an oil hydraulic pump to which the present invention is applied. The oil hydraulic pump shown includes a body b having a suction port 11 formed therein and having an annular stepped portion 12 formed at an opening of the suction port 11. A stopper 13 is provided at a predetermined location of and projects from the body b.

A suction connector c is molded using a synthetic resin or a sintered metal and has a flange portion 15 and an insertion projection 16 formed at an end portion of a tubular portion 14 thereof. The flange portion 15 is elongated on one side thereof from the tubular portion 14 as seen in FIG. 1 and has a single bolt hole 17 formed at an intermediate portion of the elongated portion thereof. Further, the insertion projection 16 is formed so that, when it is compulsorily pushed into the suction port 11, the suction connector c is temporarily fastened to the suction port 11.

Also the body b has a single bolt hole 17a (FIG. 1) formed therein in an aligned relationship with the bolt hole 17. If a side face of the flange portion 15 is contacted with the stopper 13, then the bolt hole 17 of the tubular portion 14 is aligned with the bolt hole formed in the body b in view of the specific construction and dimensioning of the suction connector c relative to the body b.

Then, if the insertion projection 16 of the suction connector c is fitted into the suction port 11 of the body b, then the annular stepped portion 12 cooperates with the flange portion 15 and the insertion projection 16 to form a seal groove 18. The seal groove 18 has a pair of side faces extending in parallel to an axial line thereof and serving as interference acting faces 18a and 18b.

A seal 19 is fitted into the seal groove 18 formed in such a manner as described above i.e., rectangular cross-section whereby the side faces 18a, 18b are larger than the top and bottom faces extending between the side faces 18a, 18b. In this instance, the seal 19 is so shaped and sized that the resilient force thereof corresponding to the interference or tightening margin acts only upon the interference acting faces 18a and 18b i.e., such that it is oval as shown in FIG. 3 and thus extra a force outward against the side faces 18a, 18b. Accordingly, the resilient force of the seal 19 does not act in a direction to move the body b and the suction connector c away from each other.

It is to be noted that, conversely to that in the oil hydraulic pump of the present embodiment, an annular stepped portion directed reversely to the annular stepped portion 12 may be provided on the insertion projection 16 side of the suction connector c.

Subsequently, a procedure of assembling the suction connector c to the body b will be described. The seal 19 is fitted into the annular stepped portion 12 of the suction port 11 first, and then, the insertion projection 16 is compulsorily inserted into the suction port 11 through the seal 19. Or else, the seal 19 is fitted on to the insertion projection 16 first, and then, the insertion projection 16 is compulsorily inserted into the suction port 11. As a result, the annular stepped portion 12, the flange portion 15 and the insertion projection 16 cooperate to construct the seal groove 18 and the suction connector c is temporarily fastened to the body b. In this instance, since the resilient force of the seal 19 corresponding to the interference acts only upon the interference acting faces 18a and 18b but does not act in a direction to move the suction connector c away from the body b, the suction connector c keeps its temporarily fastened condition.

If, in this condition, one side of the suction connector c is contacted with the stopper 13 formed on the body b, then the bolt hole 17 of the suction connector c and the bolt hole formed in the body b are aligned with each other.

Since, also in this condition, the temporarily fastened condition of the suction connector c is maintained, the assembling operator can let go of the suction connector c and insert and tighten a bolt into the bolt hole 17.

In the oil hydraulic pump of the embodiment described above, since the seal groove 18 is formed by the combination of the annular stepped portion 12 formed on the opening edge of the suction port 11 of the body b and the insertion projection 16 and the flange portion 15 of the suction connector c and the resilient force of the seal 19 corresponding to the interference acts only upon the interference acting faces 18a and 18b which extend in parallel to the axial direction of the seal groove 18 and hence of the suction connector c, a force which tends to move the body b and the suction connector c away from each other is not produced from the seal 19. Consequently, the structure for fastening them can be simplified. In short, the suction connector c can be fastened using only one bolt, and even if the suction connector c is molded using a synthetic resin or some other suitable material, it can keep sufficient strength.

Further, since a force tending to move the body and the connector away from each other does not act as described above, also it is facilitated to keep the suction connector c in its temporarily fastened condition. If the resilient force of the seal 19 otherwise acts in a direction to move them away from each other, then unless the suction connector c is temporarily fastened considerably tightly, the suction connector c will be pulled off the suction port by the resilient force of the seal 10. With the oil hydraulic pump described above, however, since the resilient force of the seal 19 does not act in the direction to move them away from each other as described above, also the force required for the temporary fastening may be weak. In other words, temporary fastening of the suction connector can be achieved by making the outer diameter of the insertion projection 16 of the suction connector c a little greater than the inner diameter of the suction port 11 or by providing a resilient force corresponding to the interference of the seal.

Accordingly, the operability in fastening using a bolt is improved and automatic assembly becomes possible.

Having now fully described the invention, it will be apparent to one of ordinary skill in the art that many changes and modifications can be made thereto without departing from the spirit and scope of the invention as set forth herein.

What is claimed is:

1. An oil hydraulic pump, comprising:

a pump body having a suction port formed therein;

a suction connector inserted in said suction port;

fastening means for securing said suction connector to said pump body;

said suction connector having thereon an insertion projection inserted within said suction port of said pump body and a flange portion;

said pump body having an annular stepped portion formed along an opening edge of said suction port in an opposing relationship to said insertion projection and said flange portion of said suction connector;

said annular stepped portion of said pump body and said flange portion and said insertion projection of said suction connector cooperating, when said insertion projection is inserted in said suction port, to define an annular seal groove which has a pair of side faces extending in parallel to an axial line of said seal groove, said seal groove having a substantially rectangular cross-sectional shape, one of said side faces being constituted by a surface of said annular stepped portion of said pump body and the other of said side faces being constituted by a surface of said insertion projection of said suction connector in opposed relationship to said surface of said annular stepped portion; and a resilient seal fitted in said seal groove structured and arranged such that said seal has an oval shape and a resilient force is exerted by said seal only upon said side faces so that, when said insertion projection is forcibly inserted into said suction port, said suction connector is temporarily fastened to said suction port.

2. An oil hydraulic pump as claimed in claim 1, wherein said fastening means comprise at least one bolt, said suction connector has at least one bolt hole formed at said flange portion thereof while said pump body has a single bolt hole formed therein, and said pump body has a stopper provided thereon for engaging with said flange portion to establish alignment between said bolt holes.

3. An oil hydraulic pump as claimed in claim 1, wherein said suction connector further comprises a tubular portion, said insertion projection being formed at an end portion of said tubular portion.

4. An oil hydraulic pump as claimed in claim 1, wherein said top face of said seal groove is constituted by said flange portion of said suction connector and said bottom face of said seal groove is constituted by said annular stepped portion of said pump body.

* * * * *